United States Patent [19]

Camp

[11] 4,354,956
[45] Oct. 19, 1982

[54] THICKENING AQUEOUS SYSTEMS WITH ALPHA-OLEFIN OXIDE-MODIFIED LIQUID POLYETHER THICKENERS

[75] Inventor: Ronald L. Camp, Riverview, Mich.

[73] Assignee: BASF Wyandotte Corporation, Wyandotte, Mich.

[21] Appl. No.: 170,498

[22] Filed: Jul. 21, 1980

Related U.S. Application Data

[62] Division of Ser. No. 86,837, Oct. 22, 1979, Pat. No. 4,288,639.

[51] Int. Cl.$^3$ .................... B01J 13/00; C09K 5/00
[52] U.S. Cl. ................................. 252/316; 252/73
[58] Field of Search ............... 252/316, 73; 568/618, 568/608, 616, 625

[56] References Cited

U.S. PATENT DOCUMENTS

| | | | |
|---|---|---|---|
| 2,174,761 | 10/1939 | Schuette et al. | 568/618 X |
| 2,425,755 | 8/1947 | Roberts et al. | 568/618 X |
| 2,602,780 | 7/1952 | Zisman et al. | 252/73 |
| 3,595,924 | 7/1971 | Kalopissis et al. | 568/618 X |
| 3,748,276 | 7/1973 | Schmolka | 252/316 |
| 3,829,505 | 8/1974 | Herold | 568/618 X |
| 4,086,279 | 4/1978 | Langdon et al. | 252/351 X |

FOREIGN PATENT DOCUMENTS

| | | | |
|---|---|---|---|
| 45-32433 | 10/1970 | Japan | 568/618 |
| 950844 | 2/1964 | United Kingdom | 568/618 |
| 1228461 | 4/1971 | United Kingdom | 568/618 |

*Primary Examiner*—Richard D. Lovering
*Attorney, Agent, or Firm*—Andrew E. Pierce

[57] ABSTRACT

New liquid thickeners for aqueous liquids are obtained by capping a liquid straight chain polyoxyalkylene compound derived from ethylene oxide or ethylene oxide and at least one other lower alkylene oxide by reacting said alkylene oxides with at least one active hydrogen-containing initiator having only one active hydrogen atom. The new thickeners are prepared at a molecular weight of about 1000 to about 25,000 utilizing an alpha-olefin oxide having a carbon chain of about 12 to about 18 aliphatic carbon atoms. Both block and heteric polyoxyalkylene compounds are useful. Alternatively, the new thickeners can be made by copolymerizing ethylene oxide or mixed lower alkylene oxides in the presence of said alpha-olefin oxide. The new thickeners exhibit an unexpected increase in viscosity in aqueous systems as compared with prior art liquid polyether thickening agents. The alpha-olefin oxide modified polyether thickening agents of the invention are useful in both water-based and water-glycol based hydraulic fluids.

12 Claims, No Drawings

THICKENING AQUEOUS SYSTEMS WITH ALPHA-OLEFIN OXIDE-MODIFIED LIQUID POLYETHER THICKENERS

This is a division of application Ser. No. 86,837, filed Oct. 22, 1979 now U.S. Pat. No. 4,288,639.

BACKGROUND OF THE INVENTION

1. Field of the Invention

This invention relates to thickeners for aqueous systems based upon polyethers of high molecular weight.

2. Prior Art

Polymeric water-soluble thickening agents are widely used for many purposes. Commercially available polymeric thickeners differ widely in chemical composition. The diversity of available thickening agents is an indication that not all are equally useful. It is not unusual to find some thickening agents which perform well in a certain environment and not at all in another environment. In fact, in some uses, no one thickening agent is completely satisfactory and there is a continual need and a continuing search for new thickening agents to satisfy many unmet needs. For instance, various cellulose derivatives or other water-soluble polymers such as sodium polyacrylates, polyacrylamides, and polyethylene glycol fatty acid diesters are representative thickening agents. The polyethylene glycol fatty acid diesters are widely used for textile printing emulsions, cosmetic emulsions, and aqueous pigment suspensions. These esters suffer from the defect that they are not resistant to hydrolysis in an acid or alkaline medium so that under such conditions the thickening effect initially obtained is gradually reduced.

Polyoxyalkylene compounds, including high molecular weight materials are well known for use as surface-active agents, as disclosed in U.S. Pat. No. 2,674,619. These compositions can be prepared at high molecular weights, for instance, up to 25,000 for use as aqueous thickeners. It is known that liquid polyoxyalkylenes can be obtained by utilizing a mixture of ethylene oxide and another lower alkylene oxide in an oxide ratio of from 75 to 90 percent ethylene oxide to 10 to 25 percent other lower alkylene oxides such as propylene oxide, as taught in U.S. Pat. No. 2,425,755. The polyethers of the prior art having high thickening efficiency are generally those having the highest molecular weights reasonably obtainable under commercial conditions with price considerations being a limiting factor. Because high molecular weight polyethers require a disproportionately longer processing time to produce, it would be desirable to prepare high efficiency thickeners utilizing lower molecular weight polymers.

In U.S. Pat. No. 3,538,033, there are disclosed polyoxyalkylene derivatives of diepoxides having thickening properties. The thickener compositions disclosed are useful for thickening aqueous systems and are prepared by reacting a diepoxide compound having at least 12 carbon atoms with an alkylene oxide adduct containing from 100 to 250 moles of ethylene oxide units.

In U.S. Pat. No. 3,829,506, there are disclosed biodegradable surface-active agents having good foaming properties and foam stabilizing characteristics prepared by copolymerizing ethylene oxide alone or with another lower alkylene oxide and an alpha-olefin oxide in the presence of a polyhydric alcohol. Molecular weights of 400 to 6000 are claimed but there is no indication that the compositions are useful as thickening agents for aqueous systems.

Low molecular weight polyethylene glycol diethers containing hydroxyl groups which are useful as foam inhibitors in washing, rinsing and cleaning compositions are disclosed in German Pat. No. 2,432,757. These are prepared by reacting a polyalkylene glycol ether containing hydroxyl groups with an alpha-olefin epoxide containing 4 to 18 carbon atoms.

In U.S. Pat. No. 3,475,499, there is disclosed the preparation of glycols and glycol ethers by reacting with water 1,2-epoxides having 3 to 30 carbon atoms. The compositions are disclosed as useful in the preparation of detergents. High molecular weight polyether block polymers are disclosed in U.S. Pat. No. 3,535,307. Such compositions have molecular weights of about 2000 to about 25,000 and are useful in the preparation of polyurethanes.

SUMMARY OF THE INVENTION

New liquid thickeners for aqueous liquids are preferably obtained by capping with an alpha-olefin oxide, a liquid straight-chain polyoxyalkylene heteric or block copolymer intermediate which is prepared by reacting ethylene oxide and at least one other lower alkylene oxide having 3 to 4 carbon atoms with an active hydrogen-containing aliphatic or alkylaromatic initiator having only one hydrogen atom and about 12 to about 18 aliphatic carbon atoms. The thickeners are prepared at a molecular weight from about 1000 to about 25,000, preferably about 1000 to about 10,000. The alpha-olefin oxide has a carbon chain of about 12 to about 18 aliphatic carbon atoms. Alternatively, the thickeners can be prepared by copolymerizing a mixture of ethylene oxide and said lower alkylene oxides in the presence of said alpha-olefin oxide. In addition, ethylene oxide homopolymers capped with said alpha-olefin oxide are useful. The new thickeners exhibit an unexpected increased thickening efficiency in aqueous systems as compared with prior art polyether thickeners of the same molecular weight.

DETAILED DESCRIPTION OF THE INVENTION

Polyether thickening agents having greatly improved thickening efficiency can be obtained by modifying conventional polyether thickening agents with an alpha-olefin oxide having about 12 to about 18 aliphatic carbon atoms or mixtures thereof. It has been found that whether said alpha olefin oxide is incorporated in the modified-polyether by copolymerization to produce a heteric or block polyether or by capping an ethylene oxide homopolymer or a heteric or block polyether, that greatly improved thickening efficiency without substantial reduction in viscosity stability under high shear conditions results.

It is well known that polyethers in comparison with esters of polyalkylene glycols, are resistant to hydrolysis under acid and alkaline conditions or under the effects of heating at elevated temperatures. Thus, under conditions where a thickening agent must maintain a substantial proportion of its thickening efficiency under conditions favoring hydrolysis of the polymer, polyether-type thickening agents are a desirable choice. Heretofore, highly efficient polyether thickeners for aqueous systems could be obtained only by utilizing high molecular weight polyether polymers such as those having a molecular weight of at least 20,000 to 25,000. The modified polyethers of the invention provide greatly increased thickening efficiency without substantial reduction in shear stability under conditions favoring hydrolysis.

The preparation of polyethers is well known in the art. Generally, polyethers are prepared utilizing a lower alkylene oxide, an active hydrogen containing compound, and an acid or basic oxyalkylation catalyst in the presence of an inert organic solvent at elevated temperatures in the range of about 50° C. to 150° C. under an inert gas pressure generally from about 20 to about 100 lbs. per square inch gauge.

Any suitable prior art alkaline oxyalkylation catalyst can be used in the practice of this invention. These include, for example, strong bases, such as sodium hydroxide, sodium methylate, potassium hydroxide, and the like; salts of strong bases with weak acids, such as sodium acetate, sodium glycolate, and the like and quaternary ammonium compounds, and the like. The concentration of these catalysts in the reaction mixture is not critical and may vary from about 0.1 percent to 5 percent by weight of the initiator compound.

An inert organic solvent may be utilized in the above-described procedures. The amount of solvent used is that which is sufficient to provide a suitable reaction medium and is generally, on a molar basis, in excess of the total amount of the reactants. Examples of suitable solvents include aliphatic hydrocarbons, such as hexane, heptane, isoheptane; aromatic hydrocarbons, such as benzene, toluene, xylene; chlorinated hydrocarbons, such as carbon tetrachloride, ethylene dichloride, propylene dichloride; and oxygenated hydrocarbons, such as diethyl ether, dimethyl ether, anisole, and the like.

In accordance with this invention, a copolymer polyether polyol is prepared by mixing ethylene oxide and at least one lower alkylene oxide having 3 to 4 carbon atoms with an active hydrogen-containing compound initiator which can be an aliphatic or alkylaromatic compound having about 12 to about 18 aliphatic carbon atoms and one active hydrogen and from about 5 moles to 15 moles per mole of said initiator of an alpha-olefin oxide having from about 12 to about 18 carbon atoms. Reaction is effeccted by heating said mixture to a temperature in the range of about 50° C. to 150° C., preferably from 80° C. to 130° C. under an inert gas pressure, preferably from about 30 to about 90 pounds per square inch gauge. The mixture of ethylene oxide and at least one alkylene oxide having from 3 to 4 carbon atoms is used in said mixture in an amount so that the resulting polyether product will contain at least 10 percent, preferably about 70 percent to about 99 percent, by weight ethylene oxide residue. Said mixture is maintained at a temperature and pressure in said range for a period from about 1 to 10 hours, preferably 1 to 3 hours.

Alternatively, block or heteric polymers of ethylene oxide and at least one lower alkylene oxide having 3 to 4 carbon atoms can be prepared as intermediates by the reaction of said alkylene oxides with said initiator. These intermediate compounds are then capped with said alpha-olefin epoxide to prepare the thickeners of this invention. Ethylene oxide homopolymers capped with said alpha-olefin oxide are also useful. If desired, a catalyst can be added to the reaction mixture prior to the ethylene oxide addition. Alkaline catalysts such as potassium hydroxide or acid catalysts such as boron trifluoride are useful, as is well established in the art.

As is well known in the art, polyethers are prepared utilizing an initiator compound which contains a reactive (or active) hydrogen atom. The term reactive hydrogen atom is well known and clearly understood by those skilled in the art. However, to remove any possible ambiguity in this regard, the term reactive hydrogen atom, as used herein and in the appended claims, includes any hydrogen atom fulfilling the following two conditions:

1. It is sufficiently labile to open the epoxide ring of propylene oxide, and
2. It reacts with methyl magnesium iodide to liberate methane in the classical Zerewitinoff reaction (see Niederle and Niederle, Micromethods of Quantitative Organic Analysis, p. 263, John Wiley and Sons, New York City, 1946).

The reactive hydrogen atoms which will fulfill the above two conditions are normally activated by being a member of a functional group containing an oxygen atom, e.g., a hydroxyl group, a phenol group, a carboxylic acid group; a basic nitrogen atom, e.g., an amine group, a hydrazine group, an imine group, an amide group, a guanidine group, a sulfonamide group, a urea group, a thiourea group; or a sulfur atom, e.g., a mercaptan, a thiophenol, a thiocarboxylic acid, hydrogen sulfide. Alternatively, certain hydrogen atoms may be activated by proximity to carbonyl groups such as those found in cyanoacetic esters, acetoacetic esters, malonic esters, as is well known in the art.

Specific classes of initiator compounds which can be used in used in preparing the polyoxyalkylene polymers of the invention include aliphatic monohydric alcohols, alkyl phenols, and aliphatic mercaptans wherein said initiator compounds contain 12 to 18 carbon atoms in the alkyl group thereof. The aliphatic monohydric alcohols include the alkane monoalcohols, alkene monoalchols, and alkyl monoalcohols. Specific examples of initiators include dodecylphenol, dodecylalcohol, dodecylcarboxlic acid, dodecylmercaptan, octadecylphenol, octadecylalcohol, octadecylcarboxylic acid, octadecylmercaptan, lauryl alcohol, myristyl alcohol, and cetyl alcohol. The use of octadecylalcohol (stearyl alcohol) is particularly preferred. The preferred initiators are the aliphatic monoalcohols having a carbon atom chain length of about 12 to about 18 carbon atoms. It is preferred that the carbon atom chain contain about 16 to about 18 aliphatic carbon atoms. Other useful alcohols are tetradecyl alcohol and hexadecyl alcohol.

The heteric or block copolymers of the invention which are capped, i.e., copolymerized with an alpha-olefin oxide having about 12 to about 18 aliphatic carbon atoms are mixtures with ethylene oxide of lower alkylene oxides having 3 to 4 carbon atoms. Generally, the proportion of ethylene oxide residue in the copolymers of the invention is at least about 10 percent by weight, preferably about 70 to about 99 percent by weight, and most preferably about 70 to about 90 percent by weight, of the mixture of ethylene oxide and the alkylene oxide having 3 to 4 carbon atoms. The lower alkylene oxides referred to are 1,2-propylene oxide and the butylene oxides such as 1,2-butylene oxide and 2,3-butylene oxide and tetrahydrofuran. The proportion of lower alkylene oxides having 3 to 4 carbon atoms utilized in combination with ethylene oxide is generally less than 90 percent by weight of the mixed copolymer and preferably is 30 to 1 percent by weight thereof.

The alpha-olefin oxides which are utilized to modify the polyethers of the prior art are those oxides generally containing about 12 to about 18, preferably about 14 to about 18, aliphatic carbon atoms and the commercially available mixtures thereof. The amount of alpha-olefin oxide required to obtain the more efficient polyether thickening agents of the invention is about 1 to about 20 percent, preferably about 1 to about 10 percent, by weight of the total weight of the polyether thickeners of the invention. This amount of alpha-olefin oxide based upon the molar amount of active hydrogen-containing initiator compound is about 5.0 mole to about 15.0 moles of alpha-olefin oxide per mole of monofunctional active hydrogen-containing initiator. Preferably, the alpha-olefin epoxide contains a mixture of about 14 to about 16 carbon atoms and linear alkyl chains. Examples of useful alpha-olefin oxides are those commercially available under the trademark VIKOLOX.

Since the preparation of heteric and block copolymers of alkylene oxides and ethylene oxide homopolymers are well known in the art, further description of the preparation of said copolymers of mixed lower alkylene oxides and ethylene oxide homopolymers is unnecessary. Further details of the preparation of heteric copolymers of lower alkylene oxide can be obtained in U.S. Pat. No. 3,829,506, incorporated herein by reference. Further information on the preparation of block copolymers of lower alkylene oxides can be obtained in U.S. Pat. No. 3,535,307, incorporated herein by reference.

Alternatively to the use of the above-described alpha-olefin oxides to modify high molecular weight polyether polyols, it is possible to substitute glycidyl ethers which can be prepared by reaction of an alcohol having 12 to about 18 carbon atoms with epichlorohydrin in accordance with the teachings of U.S. Pat. No. 4,086,279 and references cited therein, all incorporated by reference.

The following examples will illustrate the preparation of the modified polyether polyols of the invention wherein a conventional polyether polyol is modified with an alpha-olefin oxide to provide improved thickening efficiency.

EXAMPLE 1

(Control or Comparative Example)

A conventional polyether derived from ethylene oxide and 1,2-propylene oxide in the ratio of 75 percent ethylene oxide and 25 percent 1,2-propylene oxide was prepared by reaction with trimethylol propane in two stages in a stainless steel autoclave. An intermediate product was first prepared by reacting a mixture of trimethylol propane, potassium hydroxide, propylene oxide, and ethylene oxide for a period of 18 hours at 120° C. The cooled liquid product was discharged into a glass container.

The final product was prepared by reacting this intermediate product with 1,2-propylene oxide and ethylene oxide under a nitrogen atmosphere at 115° C. for 22 hours. The reaction mixture was then cooled and the viscous liquid product transferred to a glass container. The product had a molecular weight of about 23,000.

EXAMPLE 2

In this example, a heteric copolymer of ethylene oxide and 1,2-propylene oxide having a theoretical molecular weight of 8717 is prepared. This intermediate is subsequently further reacted with an alpha-olefin which is a mixture of alpha-olefin oxides having 15 to 18 carbon atoms.

Into a stainless steel one-gallon autoclave, there was charged 972 grams of stearyl alcohol, 89.6 grams of a 45 percent aqueous solution of potassium hydroxide and the mixture was heated with stirring at 115° C. at a pressure of less than 10 millimeters of mercury for 30 minutes. The vacuum was relieved with dry nitrogen to a pressure of 5 pounds per square inch gauge, and a mixture of 407 grams of propylene oxide and 1220 grams of ethylene oxide were added over a period of 4 and ¾ hours at a temperature of 115° C. After addition was complete, the mixture was stirred 70 minutes at 115° C. and cooled to 80° C. The product labeled intermediate No. 1 was thereafter discharged to a one gallon glass bottle for use in the next step.

Using the previously prepared intermediate, 476 grams of said intermediate were charged to a one-gallon stainless steel autoclave which had been previously flushed with nitrogen and heated for 15 minutes at a temperature of 115° C. and a pressure of 10 millimeters of mercury. After relieving the vacuum to a pressure of 5 pounds per square inch gauge with nitrogen, a mixture of 1303 grams of propylene oxide and 3909 grams of ethylene oxide were added over a period of 14 hours at a temperature of 115° C. After the addition of these ingredients was complete, the mixture was stirred for a period of two hours at a temperature of 115° C. and then cooled to 80° C. The second intermediate product was discharged to a one-gallon bottle in a yield of 5549 grams of liquid intermediate.

Utilizing a 2600 grams portion of the above second intermediate product, a five-liter glass vessel was charged and thereafter the vessel and its contents were heated at a temperature of 120° C. under a nitrogen atmosphere at a pressure of 20 millimeters of mercury for a period of 30 minutes. Thereafter, 76 grams of a mixture of alpha-olefin oxides having 15 to 18 carbon atom chains and sold under the trademark VIKOLOX 15-18 by the Viking Chemical Company was added all at once. After heating this mixture for a period of 8 hours at a temperature of 120° C. under a nitrogen atmosphere at atmospheric pressure, the product was cooled to 80° C. and discharged to a glass container. The product was characterized as a viscous brown liquid at room temperature.

EXAMPLE 3

Utilizing the same procedure and proportions as in Example 2 except that 7662 grams of ethylene oxide and 2554 grams of propylene oxide were utilized to prepare intermediate No. 1, a heteric copolymer of ethylene oxide, and 1,2-propylene oxide was prepared which was capped with an alpha-olefin oxide having 15 to 18 carbon atoms in the chain. The product had a theoretical molecular weight of 10,485.

EXAMPLE 4

Utilizing the same procedure and proportions as in Example 2 except that 9620 grams of ethylene oxide and 3206 grams of 1,2-propylene oxide were utilized to prepare intermediate No. 1, a heteric copolymer was prepared of ethylene oxide and 1,2-propylene oxide capped with an alpha-olefin oxide having 15 to 18 carbon atoms in the chain. The product had theoretical molecular weight of 13,095.

TABLE

Aqueous Thickening Efficiency of Olefin-Capped Polyethers

| Example | Theoretical Molecular Wt. | Heteric EP/PO Ratio | $C_{15}$—$C_{18}$ Alpha-Olefin Oxide Cap (% by Weight) | Viscosity (SUS) at 100° F. (10% by Wt. in Water) | Viscosity (SUS) at 100° F. (7.5% by Wt. in water) |
|---------|---------------------------|---------------------|--------------------------------------------------------|--------------------------------------------------|----------------------------------------------------|
| 1 | 25,000 | 75/25 | None | 51 | 41 |
| 2 | 8,717 | 75/25 | 2.9 | 1,320 | 190 |
| 3 | 10,485 | 75/25 | 2.9 | | 98 |
| 4 | 13,095 | 75/25 | 2.0 | | 266 |

The preceding examples illustrate the various aspects of the invention but are not intended to limit it. Where not otherwise specified throughout this specification and claims, temperatures are given in degrees centigrade and parts, percentages and proportions are by weight.

While this invention has been described with reference to certain specific embodiments, it will be recognized by those skilled in the art that many variations are possible without departing from the spirit and scope of the invention and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. The process of thickening aqueous systems comprising the addition of an effective thickening amount of a liquid polyether thickener having a molecular weight of about 1000 to about 25,000 to said aqueous systems, said polyether consisting of at least one of (A) polyethers prepared by reacting ethylene oxide and at least one lower alkylene oxide having 3 to 4 carbon atoms with at least one monohydric alcohol active hydrogen compound initiator containing no more than one active hydrogen and about 12 to about 18 aliphatic carbon atoms to prepare a heteric or block copolymer and further reacting said copolymer with at least one alpha-olefin oxide or aliphatic glycidyl ether each having a carbon chain length of about 12 to about 18 aliphatic carbon atoms and wherein said alpha-olefin oxide or aliphatic glycidyl ether is present in the amount of about 1 to about 20 percent by weight based on the total weight of said thickener, and (B) polyethers prepared by reacting ethylene oxide with at least one monohydric alcohol active hydrogen compound initiator to prepare a homopolymer and further reacting said homopolymer with at least one alpha-olefin oxide or aliphatic glycidyl ether wherein said initiator is an aliphatic or alkylaromatic compound which contains no more than one active hydrogen, has a carbon chain length of about 12 to about 18 aliphatic carbon atoms and wherein said alpha-olefin oxide or aliphatic glycidyl ether has a carbon chain length of about 12 to about 18 aliphatic carbon atoms, and is present in the amount of about 1 to about 20 percent by weight based on the total weight of said thickener.

2. The process of claim 1 wherein said polyether thickening agent is the reaction product of the sequential polymerization of ethylene oxide and at least one of said lower alkylene oxides to prepare an intermediate which is subsequently capped with said alpha-olefin oxide.

3. The process of claim 1 wherein said polyether is prepared by polymerizing a mixture of ethylene oxide and at least one of said lower alkylene oxides to prepare a heteric copolymer intermediate which is subsequently capped with said alpha-olefin oxide.

4. The process of claim 3 wherein said ethylene oxide is present in said polyether in an amount of at least 10 percent by weight of the weight of said polyether and said lower alkylene oxide is selected from the group consisting of propylene oxide, the butylene oxides, tetrahydrofuran and mixtures thereof.

5. The process of claim 4 wherein the proportion of said ethylene oxide to said lower alkylene oxide in said polyether polyol is in the amount of about 70 to about 99 percent by weight ethylene oxide to about 30 to about 1 percent by weight of said lower alkylene oxide.

6. The process of claim 5 wherein said monohydric alcohol initiator is an aliphatic monoalcohol selected from the group consisting of alkane monoalcohols, alkene monoalcohols, and alkyne monoalcohols.

7. The process of claim 6 wherein said initiator is an alkane alcohol selected from the group consisting of at least one of stearyl alcohol, lauryl alcohol, myristyl alcohol, and cetyl alcohol.

8. The process of claim 7 wherein the mole ratio of said initiator to said alpha-olefin oxide is 1:5 to 1:15.

9. The process of claim 8 wherein said aqueous system comprises water or a mixture of water and ethylene glycol.

10. A composition comprising water and a polyether thickener having a molecular weight of about 1000 to about 25,000 wherein said polyether is selected from the group consisting of at least one of (A) polyethers prepared by reacting ethylene oxide and at least one lower alkylene oxide having 3 to 4 carbon atoms with at least one monohydric alcohol active hydrogen compound initiator containing no more than one active hydrogen and about 12 to about 18 aliphatic carbon atoms to prepare a heteric or block copolymer and further reacting said copolymer with at least one alpha-olefin oxide or aliphatic glycidyl ether each having a carbon chain length of about 12 to about 18 aliphatic carbon atoms and wherein said alpha-olefin oxide or aliphatic glycidyl ether is present in the amount of about 1 to about 20 percent by weight based on the total weight of said thickener, and (B) polyethers prepared by reacting ethylene oxide with at least one monohydric alcohol active hydrogen compound initiator to prepare a homopolymer and further reacting said homopolymer with at least one alpha-olefin oxide or aliphatic glycidyl ether wherein said initiator is an aliphatic or alkylaromatic compound which contains no more than one active hydrogen, has a carbon chain length of about 12 to about 18 aliphatic carbon atoms and wherein said alpha-olefin oxide or aliphatic glycidyl ether has a carbon chain length of about 12 to about 18 aliphatic carbon atoms, and is present in the amount of about 1 to about 20 percent by weight based on the total weight of said thickener.

11. The composition of claim 10 additionally containing ethylene glycol.

12. The composition of claim 11 wherein said polyether is prepared by the heteric polymerization of a mixture of ethylene oxide and propylene oxide with stearyl alcohol as initiator to produce an intermediate heteric copolymer which is subsequently capped with said alpha-olefin oxide to produce a polyether having a molecular weight of about 1000 to about 25,000.

* * * * *